(12) United States Patent
Popovic et al.

(10) Patent No.: US 10,185,205 B2
(45) Date of Patent: Jan. 22, 2019

(54) CMOS COMPATIBLE OPTICAL MODULATORS

(71) Applicant: The Regents of the University of Colorado, a body corporate, Denver, CO (US)

(72) Inventors: Milos Popovic, Boulder, CO (US); Fabio Pavanello, Boulder, CO (US)

(73) Assignee: The Regents of the University of Colorado, a body, Denver, CO (US)

( * ) Notice: Subject to any disclaimer, the term of this patent is extended or adjusted under 35 U.S.C. 154(b) by 362 days.

(21) Appl. No.: 15/209,488

(22) Filed: Jul. 13, 2016

(65) Prior Publication Data
US 2017/0315421 A1 Nov. 2, 2017

Related U.S. Application Data

(60) Provisional application No. 62/192,003, filed on Jul. 13, 2015.

(51) Int. Cl.
*G02F 1/29* (2006.01)

(52) U.S. Cl.
CPC ............ *G02F 1/29* (2013.01); *G02F 2201/06* (2013.01); *G02F 2202/10* (2013.01)

(58) Field of Classification Search
CPC ..... G02F 1/29; G02F 2201/06; G02F 2202/10
USPC ....................................................... 359/315
See application file for complete search history.

(56) References Cited

U.S. PATENT DOCUMENTS

| | | | |
|---|---|---|---|
| 7,903,909 B2 | 3/2011 | Popovic | |
| 8,447,145 B2* | 5/2013 | Goldring | B82Y 20/00 |
| | | | 359/237 |
| 8,947,764 B1* | 2/2015 | DeRose | G02F 1/29 |
| | | | 359/315 |
| 9,740,080 B2* | 8/2017 | Ellis-Monaghan | G02F 1/3137 |
| 2002/0080461 A1* | 6/2002 | Karasawa | G02F 1/1345 |
| | | | 359/254 |
| 2010/0097614 A1* | 4/2010 | Kourogi | A61B 5/0066 |
| | | | 356/477 |
| 2014/0241656 A1 | 8/2014 | Meister et al. | |

OTHER PUBLICATIONS

G. T. Reed et al., Silicon optical modulators, nature photonics, vol. 4, 518-526, Aug. 2010.
(Continued)

*Primary Examiner* — William R Alexander
*Assistant Examiner* — Grant Gagnon
(74) *Attorney, Agent, or Firm* — Macheledt Bales LLP; Jennifer L. Bales

(57) ABSTRACT

Ring modulators based on interdigitated junctions may be driven in full or partial standing wave mode and, active regions (providing the modulation) and light-absorptive regions (e.g. providing electrical conduction) are placed in a pattern inside a resonant cavity in order to match the maxima and minima of the optical field, respectively. The pattern may be periodic to match the periodicity of a typical electromagnetic field which is periodic with the wavelength. It may also be aperiodic in the case that the cross-section or materials are engineered along the direction of propagation such that the propagation constant (and thus wavelength, i.e. optical wave "local periodicity") change along the propagation direction.

20 Claims, 14 Drawing Sheets

(56) References Cited

OTHER PUBLICATIONS

Michael R. Watts et al., Maximally Confined Silicon Microphotonic Modulators and Switches, IEEE, 457-458, 2008.
Karan K. Mehta et al., Polycrystalline silicon ring resonator photodiodes in a bulk complementary metal-oxide-semiconductor process, Optics Letters, vol. 39, No. 4, Feb. 15, 2014.
Christopher Batten et al., Building Many-Core Processor-to-DRAM Networks with Monolithic CMOS Silicon Photonics, IEEE Micro, vol. 29, No. 4, pp. 8-21, Jul./Aug. 2009.
M. Georgas et al., A Monolithically-Integrated Optical Transmitter and Receiver in a Zero-Change 45nm SOI Process, IEEE Symposium on VLSI Circuits, 2014.
Andrew Alduino et al., Wiring electronics with light, nature photonics, vol. 1, 153-155, Mar. 2007.
Qianfan Xu, Micrometre-scale silicon electro-optic modulator, Nature, vol. 435, 325-327, May 19, 2005.
Jeffrey M. Shainline, Depletion-mode carrier-plasma optical modulator in zero-change advanced CMOS, Optics Letters, vol. 38, No. 15, 2657-2659, Aug. 1, 2013.
Stefan Meister, Matching p-i-n-junctions and optical modes enables fast and ultra-small silicon modulators, Optics Express, vol. 21, No. 13, 16210-16221, Jul. 1, 2013.

\* cited by examiner

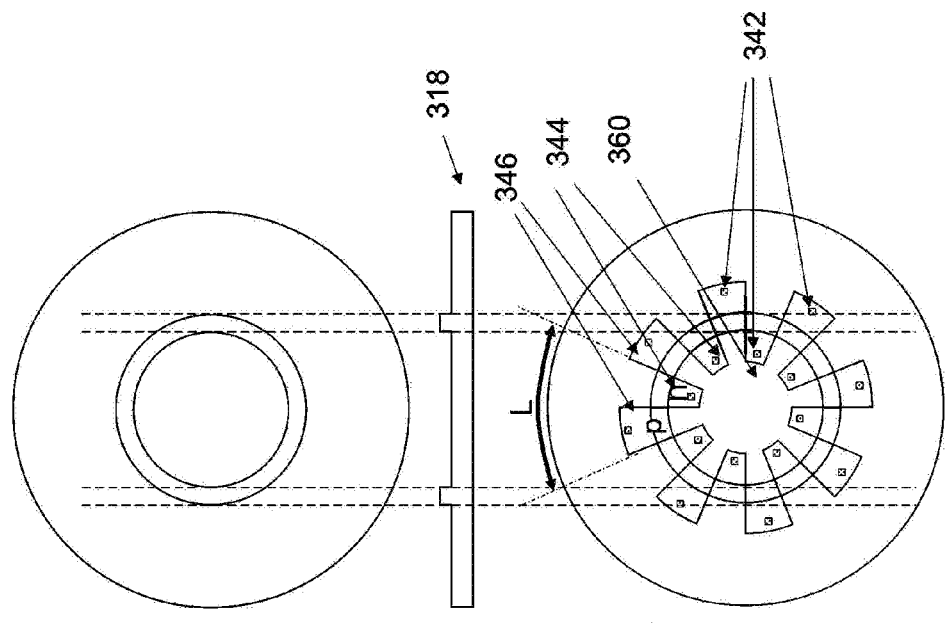
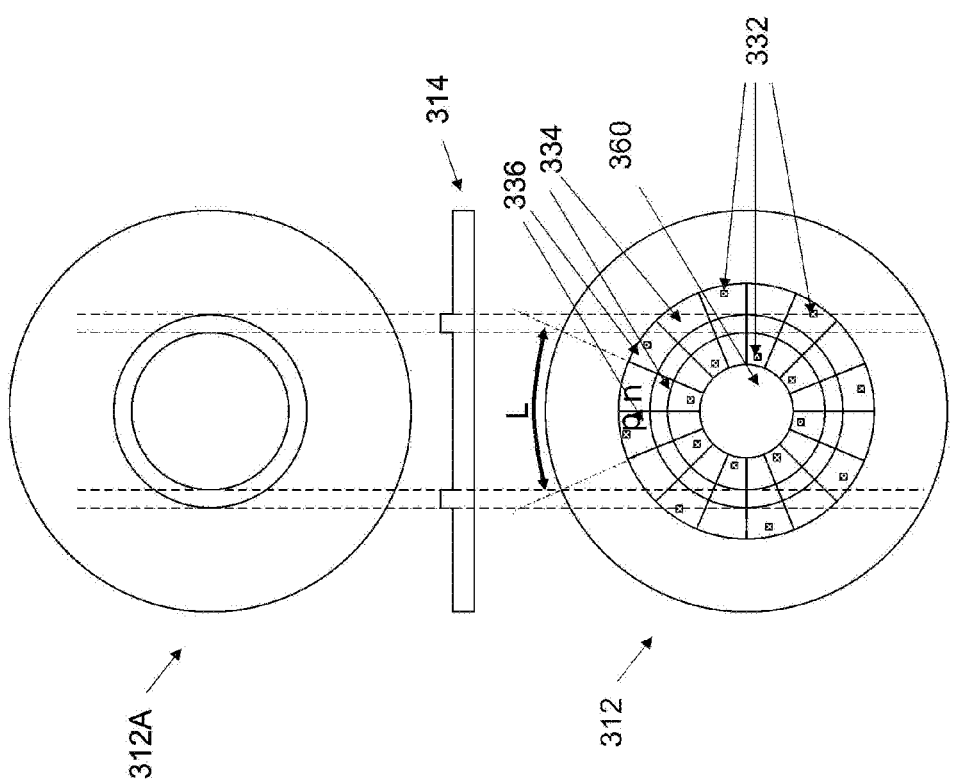

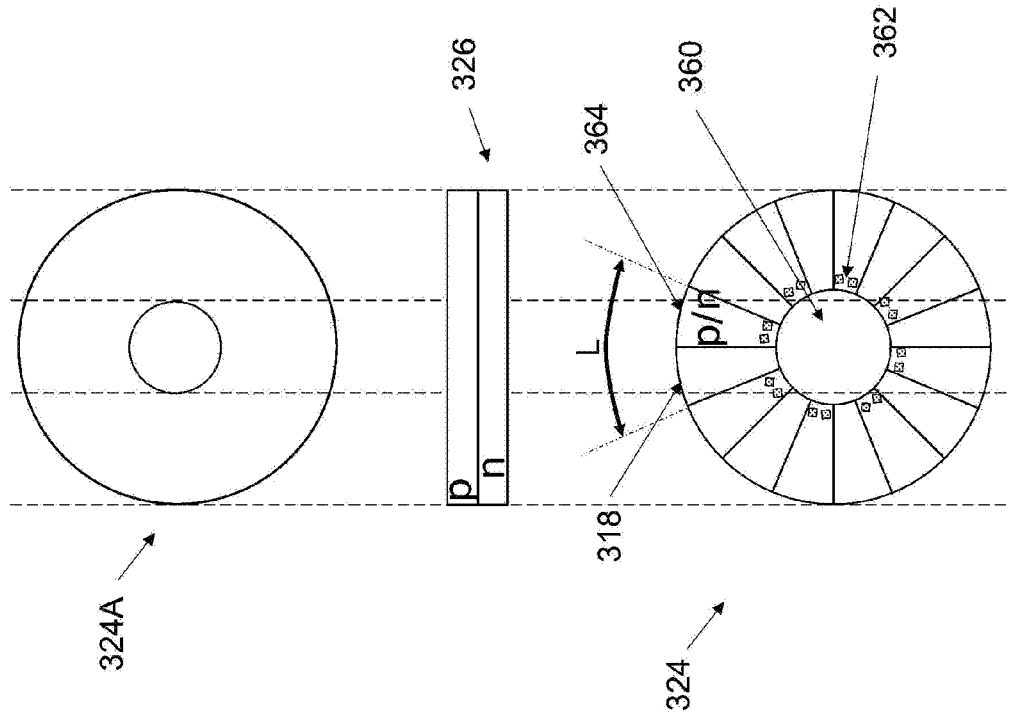
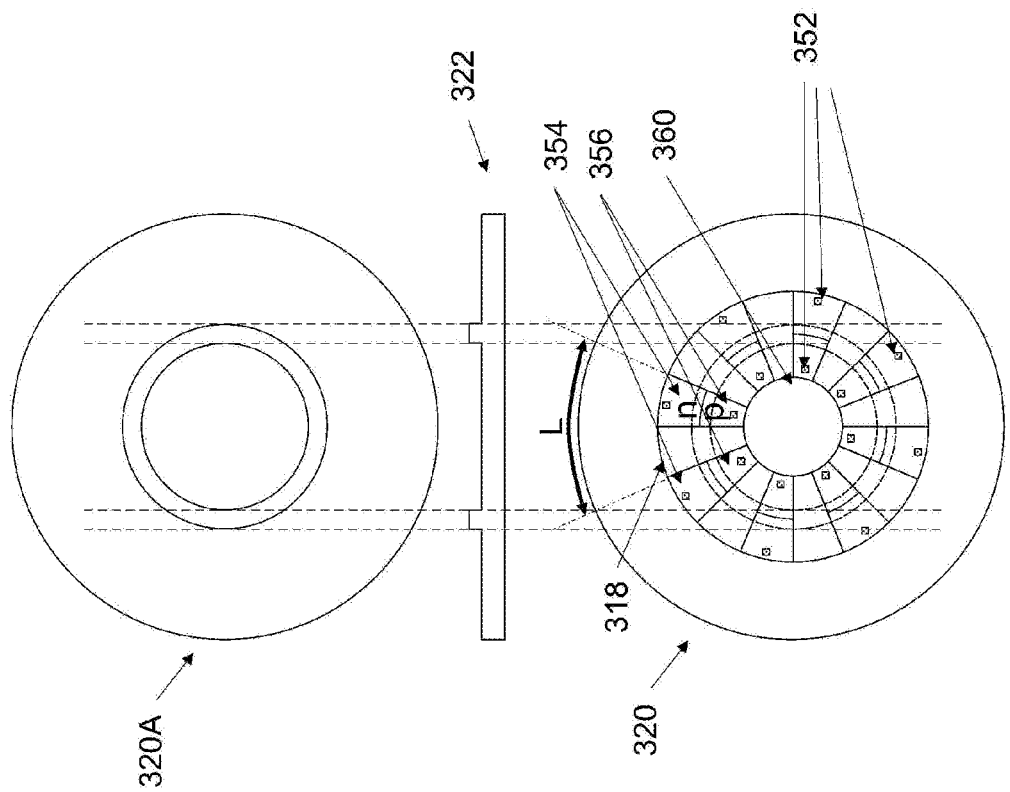

CMOS COMPATIBLE OPTICAL MODULATORS

Provisional application for patent No. 62/192,003, filed 13 Jul. 2015 is incorporated herein by reference.

This invention was made with government support under Grant No. HR0011-11-C-0100 awarded by the DARPA program on Photonically Optimized Embedded Microprocessors (POEM). The government has certain rights in this invention.

BACKGROUND OF THE INVENTION

Field of the Invention

The present invention relates to CMOS compatible optical modulators, and in particular electro-optic modulator or detector devices exploiting field maxima and nulls along the propagation direction of an optical field to opportunely place active regions which may introduce modulation of the local refractive index or absorption properties.

Discussion of Related Art

Optical interconnects offer several advantages compared to electrical interconnects in terms of bandwidth, required energy per bit, routing and latency. In order to be a valuable approach commercially, optical interconnects should preferably be realized in complementary metal oxide semiconductor (CMOS) compatible processes in order to leverage the fabrication costs.

Optical modulators realized in silicon are regarded as one of the key elements for future on-chip and chip-to-chip optical interconnects. They are essential components which encode information on an optical carrier to be transmitted through a link and successively decoded by means of a photo-detector to retrieve the transmitted signal. Silicon optical modulators are mainly based on the free carriers plasma effect where the refractive index of the light depends upon the carrier concentration in the light traveling region.

Optical modulators can be divided in two major categories: broadband and resonant. Broadband modulators such as in Mach-Zehnder (MZ) configurations offer a larger optical bandwidth, but require larger footprints and higher driving voltages and energy per bit compared to resonant modulators such as microring configurations. Optical silicon ring modulators based on a p-type doped region, an intrinsic region and an n-type region (p-i-n) were first introduced in 2005 and have been shown to provide superior performance in terms of required phase shift to switch (voltages, energy) compared to MZ devices. However, in consideration of designing also for maximum speed the operating voltage range is very important. Due to the electrical/material characteristics of diodes, the operating range close to or above the conduction state of diodes leads to a non-negligible minority diffusion current within the non-depleted regions of the diode. Recombination times of minority carriers in these regions are in the order of ns or larger which limit the speed at which diodes can be driven. Operation in such a regime is called injection as de facto carriers are injected in the depleted or intrinsic region of the diode. On the other hand, the above diffusion current is negligible when the diode is operated below the conduction state in the so-called depletion mode where the reverse or slightly forward applied bias voltage contributes mainly to a shift in the depletion region width—modulating the carriers density at the edges of the depletion region (where in a certain region it changes from depleted of carriers to not depleted of carriers). In the latter mode, the speed is not limited anymore by carrier diffusion and the circulating current is generally negligible in terms of diode driving energy. In depletion mode the speed is limited electrically by the network of capacitances (mainly the reverse bias diode capacitance and wires capacitance) and resistances (mainly access resistance to the diode e.g. wires or transmission line impedance).

There exist different implementations of resonant ring modulators realized in silicon photonics platforms. These implementations seek to optimize the modulation shift of the resonant cavity, while at the same time to provide a large extinction at the resonant condition to achieve a strong modulation depth.

One of the main implementations is the ridge waveguide structure. It is based on a 2-level structure where the thicker region is addressed to the optical modulation of the light, while the thinner region is addressed to the electrical contacting of the diode to be driven and offers a low resistance path to it. A portion of the thinner region presents generally a higher carrier concentration compared to its thicker region. This 2-level structure provides good confinement for the light and permits good electrical contact of the diode, while not significantly affecting the resonant enhancement (quality factor) provided by the cavity due to the lower optical field intensity in the high doped regions or in proximity of the metallic contacts. However, such a structure requires a partial etch step to be carried out in processing the silicon device layer which is not present in native commercial (electronics) CMOS processes. This aspect does not permit 2-level structures within commercial CMOS foundries as such a step is not present and allowed in the process flow. Native commercial CMOS processes offer several benefits compared to CMOS compatible processes as they inherently have high-speed transistors, multi-level metal wiring and built-in passive components. The integration of photonics in native CMOS processes has been recently reported to achieve high performance and integration with complex circuitry. Even for applications employing customized CMOS or CMOS-like processes tailored to photonics, it may be desirable to avoid partial etch steps. This is because partial etch steps must determine the height of the ridge sides by a timed etch typically, which introduces substantial uncertainty in that dimension. On the other hand, silicon device layer thickness is relatively precisely controlled (e.g. to a couple of nanometers within wafer, 5 nm wafer to wafer, in the case of manufacturer SOITEC).

One design shown in FIG. 1 (Prior Art) which avoids such a 2-level structure uses an electro-optic depletion modulator 100 comprising a travelling wave resonator 102 having interdigitated, azimuthally-placed diodes 110 (comprising n-doped regions 112 and p-doped regions 114) and metallic contacts 122 only on the inner region of the resonant cavity, around the center 118 of the ring. This design uses unidirectional excitation. This design is described in "Depletion-mode carrier-plasma optical modulator in zero-change advanced CMOS," by J. M. Shainline et al., Optics Letters vol. 38, no. 15, pp. 2657-2659, 2013.

For this type of geometry it is possible to achieve a good confinement (via whispering gallery mode index-step confinement by the fully etched silicon boundary at the outer radius of the disk), while having low optical losses from highly doped regions (along the inner radius placed far enough radially inward to avoid substantial overlap with the optical resonant field, but far enough radially outward (close to optical field) for low access resistance to diodes 110 that overlap the optical field) and low scattering losses from metallic contacts 122 (also far enough radially inward that they do not interact with the light). This structure exploits the confinement of the optical mode to the outer radius in order to avoid scattering losses at the inner radius location. However, it is desirable in such a structure to achieve a large resonance frequency shift when modulating from off to on. This relies on the percentage of the cavity volume (overlapping the optical field) which can be depleted of carriers upon drive by an electrical signal. The part of the cavity volume that is depleted in this case extends from the p-n interfaces 116 toward the centers of the doped regions 110. The device performance also depends on the ability to provide a low access resistance from contacts 122 to diode junctions 116 to be able to drive the diodes with low RC time constant (high speed) all across the junctions, i.e. all along the radial direction of the cavity. The carrier concentration which does not get modulated (between adjacent junctions 116), although necessary for electrical conduction, is responsible also for optical losses which reduce the overall modulation depth for a given shift due to the widening of the optical linewidth. It also puts a lower limit on the optical linewidth of the resonant modulator and therefore on the drive voltage/energy efficiency.

Electro-optic modulator 100 of FIG. 1 includes a waveguide 104, into which incident waves 106 are inserted. Incident waves couple in the optical resonator 102 through a coupling region 120. Optical waves present in the resonator are modulated and couple back to the waveguide 104 resulting in a modulated output 108.

It would be beneficial to have high optical intensity localized in the regions of the cavity dedicated to carrier modulation, while having low optical intensity in regions that maintain a carrier density that is not modulated (thereby presenting an undesired constant optical loss), and is present for electrical conduction purposes, rather than having a constant averaged optical intensity in both types of regions.

SUMMARY

It is an objective of this invention to maximize the overlap of the optical field with the region of the cavity that can have actively modulated refractive index (carrier density), while minimizing the overlap of light with carriers in regions in which carrier density is not modulated (and which therefore do not contribute to modulation, but would still contribute to optical loss if there were significant overlap).

Several geometries have been considered for the placement of p-n junctions. If we consider the ring waveguide to have a cross-section, having a (radial) width and (along the axis of the ring) height, as well as an azimuthal propagation direction, then we can discuss possible electrical junction design in rings and straight waveguides using those three directions in a unified manner. Basically, placing junctions along each of the three directions is accomplished in various embodiments of the present invention. First, "lateral" p-n or p-i-n junctions are oriented with the p to n forward-bias current flow along the width/radius, and the junction surface in the plane of the height and propagation direction. Second, in "vertical" p-n junctions, p to n current flow is along the height, and the junction is in the plane of the width/radius and propagation directions. Third, in "longitudinal" junctions, p to n forward-bias current flow is along the propagation direction, and the junctions are along the plane defined by the width/radius and height directions.

Embodiments of the present invention engineer the design of the optical mode, carrier densities and junctions, to optimally design for the presence of field nulls. Specifically, if standing waves are excited, and field nulls are stationary in space, embodiments put the field maxima where carrier density is modulated, and where there are "dead" regions that produce optical loss but do not contribute to modulation (such as unmodulated regions with fixed carrier density) those are placed in the field nulls.

Other embodiments comprise traveling wave resonators and resonant modulators, as these are more convenient to design on-chip. For add-drop filters this is because traveling wave microrings automatically separate through and drop ports from the input, without need for circulators.

The present invention implements traveling wave modulators such as microring modulators driven with a full or partial standing wave excitation and junction geometries designed to maximize modulation and minimize optical loss. Modulators based on longitudinal (often interdigitated) junctions (where the depletion region is orthogonal to the direction of light propagation) along a resonator, and employing full standing or partial standing wave excitation are described. The same concepts are also applied to lateral and vertical junctions where the depletion region is parallel to the direction of light propagation.

In one embodiment, this modulation is accomplished by the carrier plasma effect in introduced localized doped semiconductor regions and via the electrical control of carrier density in those regions.

In standing wave operation the optical field presents maxima and minima of intensity at specific locations and therefore does not sample all of the regions of the cavity equally. The interference of a forward and a backward propagating mode, which form a standing wave pattern, interfere constructively in some regions (maxima) and destructively in others (minima). The effective loss is determined by an overlap integral of the field distribution with the imaginary part of the refractive index spatial distribution. Thus, the electric field intensity of the optical mode is a "weighting function" on the spatial distribution of the loss. If the field has nulls where the loss is, there is minimal loss.

Therefore, in preferred embodiments, the maxima and minima of the optical intensity are matched to the modulation and contact regions, respectively, and then there is an enhancement of the modulation as well as a reduction of the losses.

BRIEF DESCRIPTION OF THE DRAWINGS

FIGS. 3A-3F show various geometries of traveling wave resonators and modulators according to the present invention. FIG. 3A shows top and side section views of a fully etched disk. FIG. 3B shows top and side section views of a fully etched ring. FIG. 3C shows top and side section views of a rib-waveguide ring resonator with contacts on both sides of the rib. FIG. 3D shows top and side section views of a rib-waveguide ring resonator with inner and outer rib contacts. FIG. 3E shows top and side section views of a rib-waveguide ring resonator with lateral p-n junctions. FIG. 3F shows top and side section views of a full-etched ring resonator with vertical p-n junctions located periodically in the azimuthal direction

DETAILED DESCRIPTION

Various embodiments of the present invention provide different photonic design implementations of a traveling wave resonant cavity and modifications thereof which exploit full or partial standing wave modes. The cavity might have a larger refractive index for the core than the surrounding cladding to achieve strong confinement. The resonant cavity can be made of any semiconductor material which provides the possibility of changing locally its complex (real and imaginary) refractive index, e.g. by modifying the carriers concentration (free carriers plasma effect) or by applying an electric field (Franz-Keldysh effect). While the presented designs are particularly advantageous for lossy phase modulation mechanisms, such as carrier plasma effect, by allowing both enhancement of phase modulation and minimization of loss, it is also of use for loss-only or phase only modulation mechanisms. For the latter, placing the phase mechanism (e.g. electro-optic polymer modulation) into field maxima can maximize the optical overlap integral and increase modulation efficiency. Likewise, the Franz-Keldysh effect uses absorption as the actual modulation mechanism, and in that case the loss generating regions would ideally be placed in the field maxima, while the field nulls would be left passive, to minimize capacitance associated with modulation.

Figure 1:
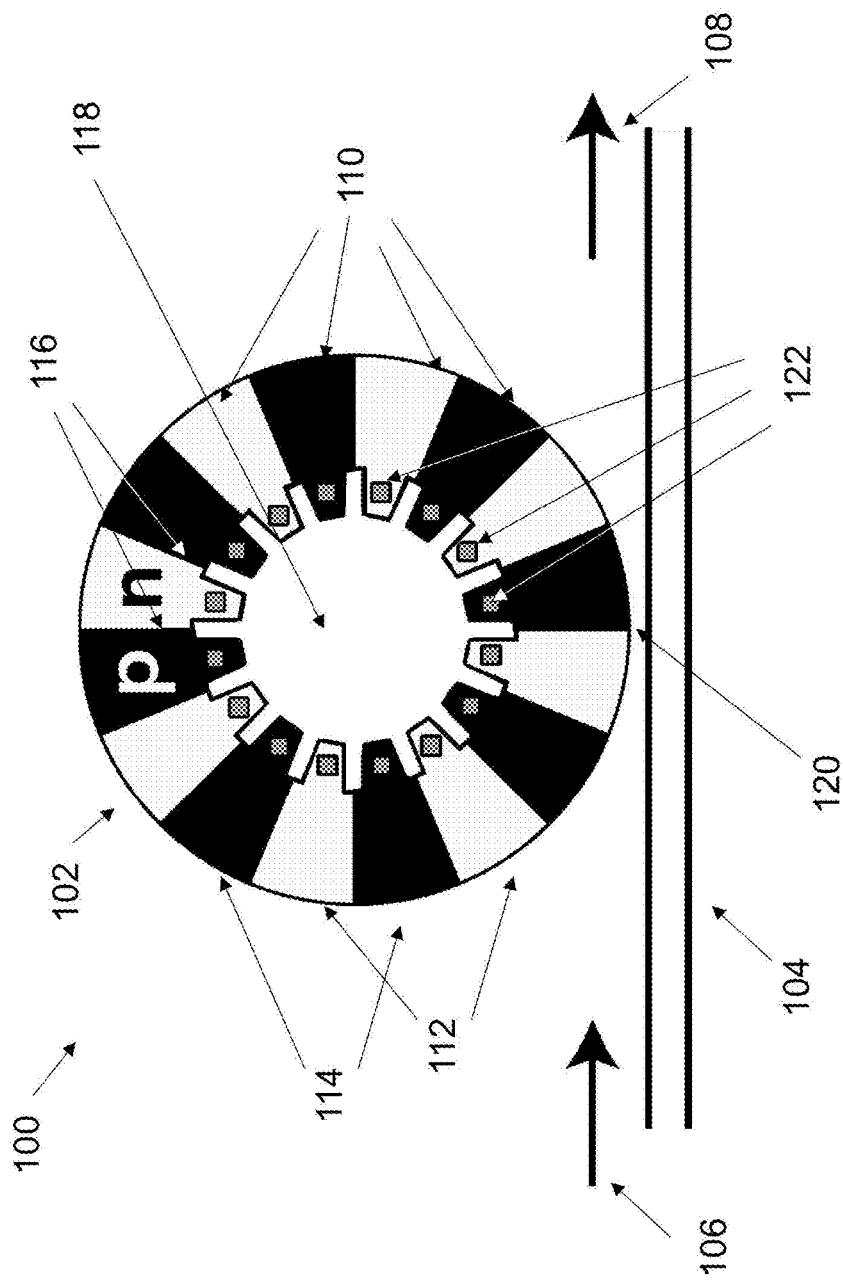
FIG. 1 (Prior Art) is a top schematic view of a unidirectional electro-optic modulator.
Figure 2A:
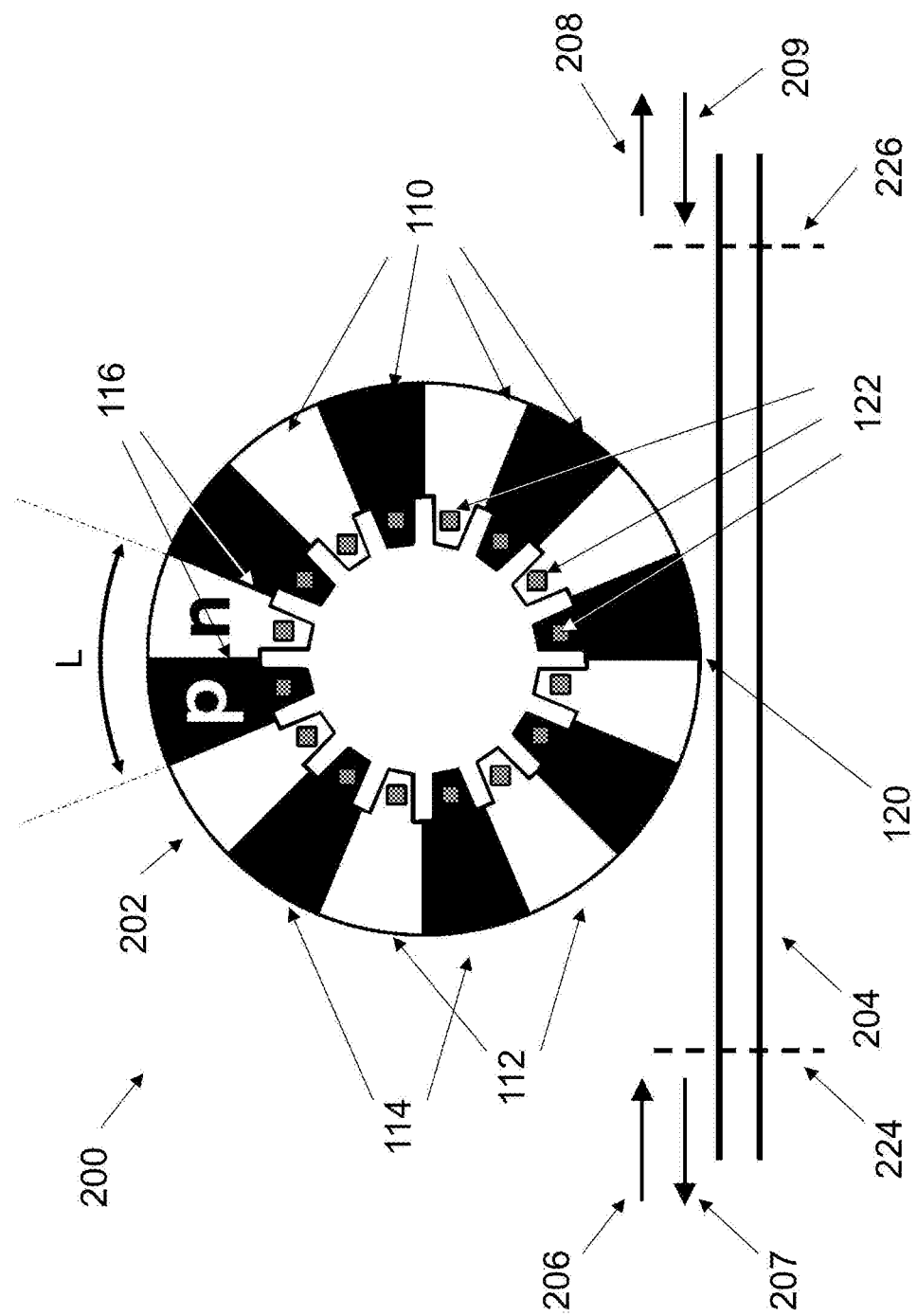
FIG. 2A is a top schematic view of a bidirectional electro-optic depletion modulator according to the present invention.

FIG. 2A is a top schematic view of a bidirectional electro-optic depletion modulator 200 according to the present invention. It resembles conventional modulator 100 of FIG. 1 in several ways, but includes two important differences. First, it supports at least one full standing wave mode, or two traveling wave modes that enable the excitation of either a full standing wave or a partial standing wave by the equal or unequal excitation of forward and backward traveling waves (here, counterclockwise and clockwise, respectively). Second, the patterning periodicity, L, is configured such that the modulating regions overlap with the maxima of the optical intensity of the excited field distribution, while the non-modulating (lossy) regions overlap with the minima of the optical intensity distribution.

FIG. 2A shows a depletion modulator 200 based on a traveling wave resonator 202 with interdigitated, azimuthally-placed n regions 112 and p regions 114 forming longitudinal p-n junctions, and with bi-directional excitation in the bus waveguide 204 so as to form a standing wave excitation in the cavity.

The patterning periodicity L is such that the modulating regions (in this case surrounding junctions 116) overlap with the maxima of the optical intensity of the excited field distribution, while the non-modulating (lossy) regions (in this case about half way between adjacent junctions 116) overlap with the minima of the optical intensity distribution. For such a condition to be valid the periodicity L of the unit-cell to be repeated needs to be close to $L=\lambda_o/n_{\it eff}$ where $\lambda_o$ is the wavelength in vacuum and $n_{\it eff}$ is the effective refractive index of the traveling wave mode. More generally, modulating regions could be placed at a subset of intensity maxima, and loss regions at a subset of intensity minima. Furthermore, if the optical field is not azimuthally periodic (as would be the case if e.g. the radial width of the waveguide changes as a function of azimuthal position around the ring) then the structure need not to be periodic, it should simply follow the principle of matching modulating and loss regions to intensity maxima and minima.

Metallic contacts 122 and corresponding silicided and highly doped regions (not shown) underneath and near to them (used to ensure ohmic contact and good conduction in semiconductor CMOS processes) are placed on the inner radius to avoid losses from optical field interaction with them. However, the presence of optical intensity minima enables placement of those contacts closer to the outer radius thus 1) reducing the resistance from contacts 122 to the lightly doped regions 110 (access resistance to the diodes), and 2) allowing reduction of the cross-section of the device's junctions 116 (i.e. their radial length) and their consequent capacitance, thus improving both the energy consumption (proportional to $CV^2$) and speed (improved by reducing time constant RC).

In order to have this matching condition, the mode number of the cavity (or the number of optical field periods in the active part of the cavity in case the cavity is not fully active) is generally equal to the number of repeated unit-cells. In FIG. 2A the unit-cell is represented as a p-n junction, however this unit-cell may contain instead p-i-n junctions, or metal-oxide-semiconductor (MOS) or silicon-insulator-silicon (SIS) capacitor type structures, for example, or any other carrier modulation device compatible with low or moderate optical loss. Moreover, the p and n regions may each be formed of several regions with different doping concentration values. In fact it may be beneficial to have a cavity 252 (See FIG. 2B) with low doped n regions 112 and p regions 114 for the modulation in order to avoid applying large voltage swings, due to the relationship between depletion width and voltage, and high doped 128 n+ regions and 130 p+ regions at the optical intensity minima to provide faster diodes (via a better conducting path to deliver charge to terminals 122) without significantly affecting the quality factor Q of the cavity (see FIG. 2B). Other types of modulating regions may be composed of Franz-Keldysh active materials (e.g. silicon germanium) to build resonant electro-absorption modulators.

Figure 2B:
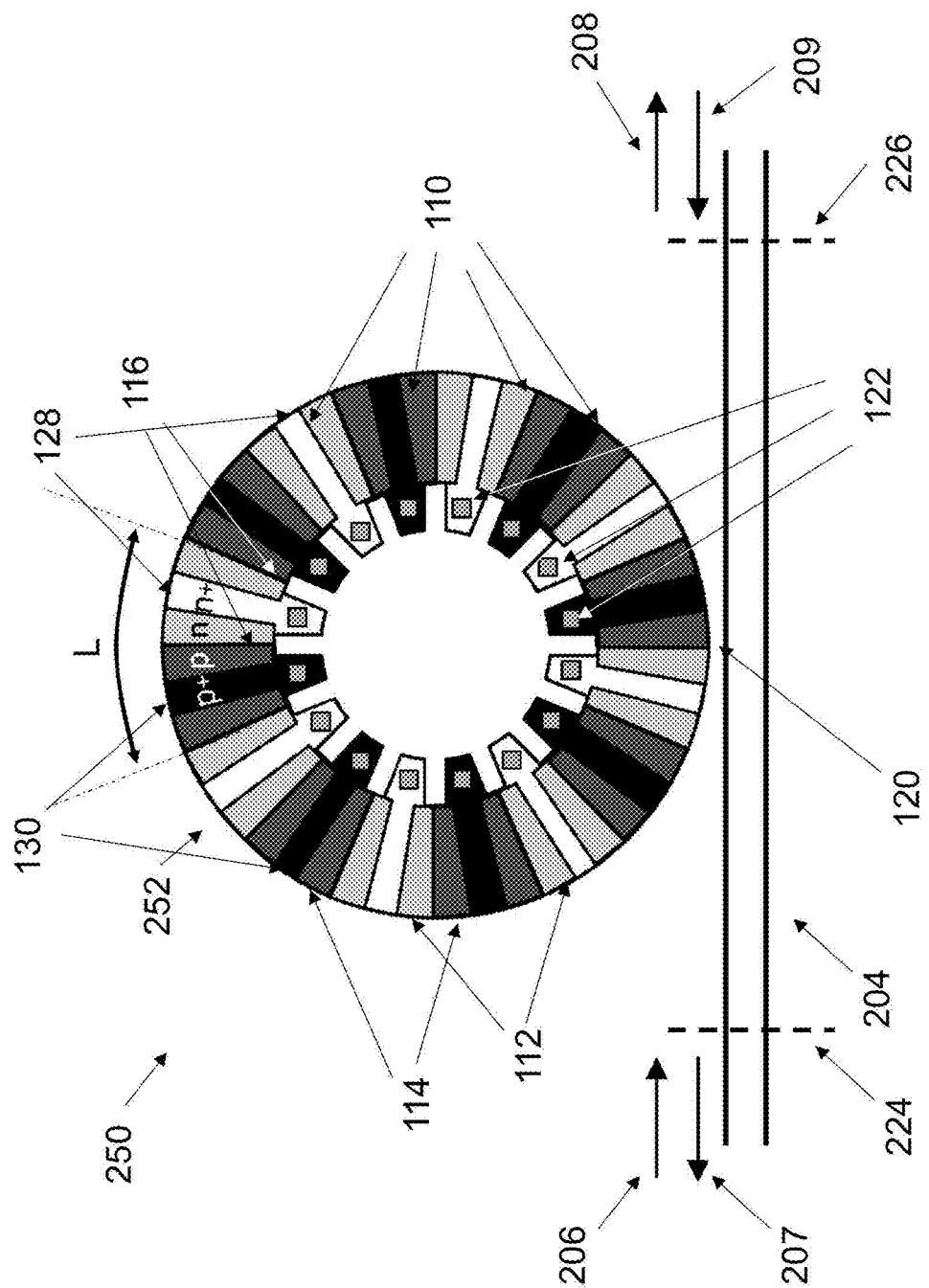
FIG. 2B is a top schematic view of a second embodiment of a depletion modulator according to the present invention, having azimuthally-placed n/n+ regions and p+/p regions.

FIG. 2B shows a depletion modulator 250 based on a traveling wave resonator 252 with interdigitated, azimuthally-placed n/n+ regions 112, 128 and p/p+ regions 114, 130 forming longitudinal p-n junctions, and with bi-directional excitation in the bus waveguide so as to form a standing wave excitation in the cavity.

Multiple architectures can be used to excite a full or partial standing wave mode in the resonant cavity. One way to excite the standing wave mode consists in having two inputs 206 and 209 and two outputs 207 and 208 as shown in FIGS. 2A and 2B. Thus, port 224 receives incident wave 206 and returns reflected wave 207, and port 226 receives incident wave 209 and returns reflected wave 208. The two inputs may need to be excited with the correct relative phase relationship depending on the geometrical distribution of the modulating regions with respect to the coupling region 120 between the cavity and the bus waveguide 204. This shift can be obtained by tuning the phase shift in one of the two arms with a phase shifter, which may be a microheater based active phase shifter, or may simply be based on unbalanced arms lengths (different by the desired fraction of a wavelength) to a common source of the input radiation. For example, for a 180 degree phase shift, one arm would be half a guided wavelength longer than the other.

Figure 3B:
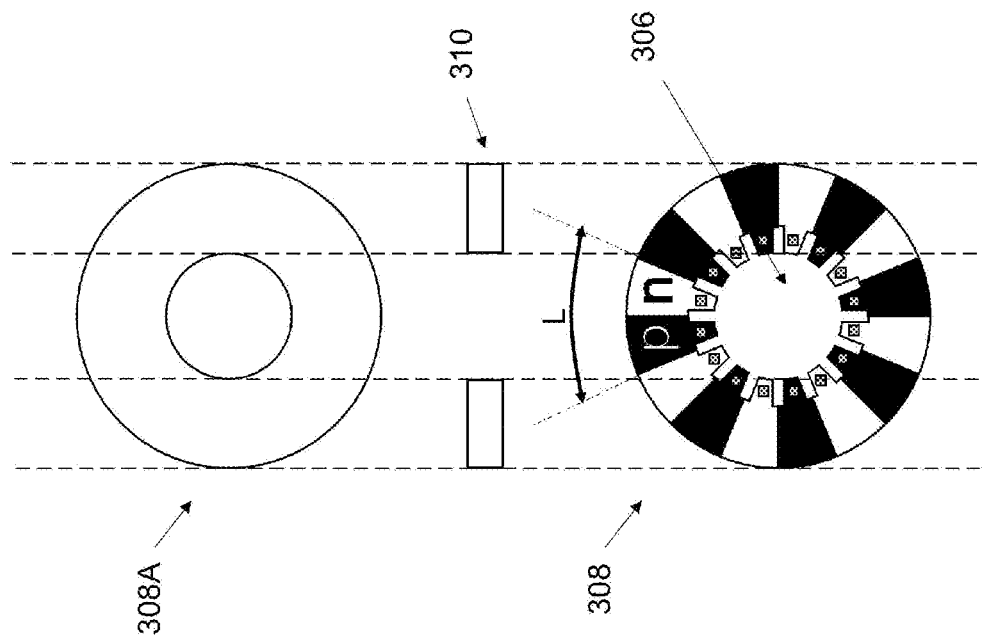

FIGS. 3A-3F show various geometries of traveling wave resonators and modulators based on interdigitated p and n type doped regions, including a fully etched disk 302 (FIG. 3A), fully etched ring ("spoked ring") 308 (FIG. 3B), a rib-waveguide ring resonator 312 with longitudinal interdigitated p-n dopings and contacts placed purely on the inner edge (FIG. 3C) a rib-waveguide ring resonator 316 with contacts on the inner and outer edges (FIG. 3D), a rib-waveguide ring resonator 320 with lateral p-n junctions located periodically in the azimuthal direction (FIG. 3E) and a full-etched ring resonator 324 with vertical p-n junctions located periodically in the azimuthal direction (FIG. 3F).

Figure 3A:
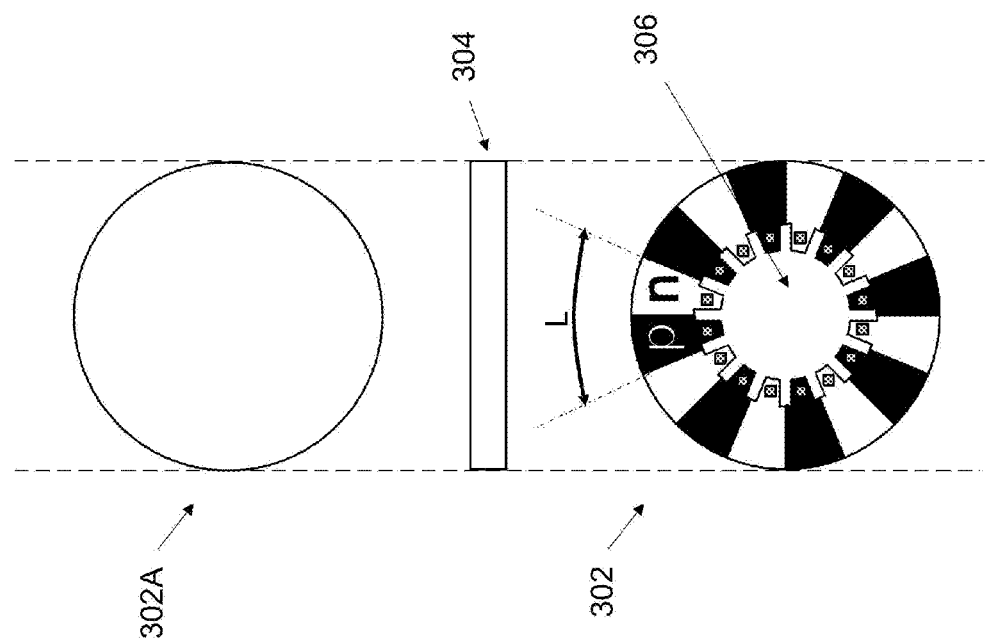

Different doping and cavity geometries which can exploit standing-wave modes are selected for efficient modulation. In FIG. 3A the easiest modulator implementation 302 (bottom) utilizes a fully-etched disk 302A (top) whose cross-section 304 (center) consists of a strip waveguide (the high refractive index guiding material is only defined by one etching mask and is surrounded by low refractive index materials). The doping geometry of the cavity 302 might be the same one as of the cavity 202 in FIG. 2A. The central region 306 in this case is not doped i.e. is intrinsic.

A modulator variant 308 is shown in FIG. 3B. It consists of a fully-etched ring cavity 308A with a strip waveguide profile 310. This choice allows a higher confinement of the optical mode compared to 302.

In FIG. 3C a modulator 312 utilizes a partially etched ring cavity 312A whose cross-section is a rib waveguide 314 (the high refractive index guiding material is defined by two etching masks and the optical field is confined mostly in the thicker device layer). The interdigitated doping geometry for the n doping regions 334 and p doping regions 336 are similar to modulator 202 shown in FIG. 2A. However, this geometry presents a better confinement of the optical mode and allows contacts 332 on both sides of rib waveguide 312 based ring reducing the series resistance.

In FIG. 3D a variant 316 of the geometry shown in FIG. 3C is presented. Partially etched ring cavity 316A, whose cross-section is a rib waveguide 318 resembles the embodiment of FIG. 3C. The difference consists in having n doping regions 344 and p doping regions 346 not defined on the same extent in the radial direction, but to achieve an interdigitated junction with large overlap with the optical field. In such a way it is possible to minimize the device capacitance without compromising the modulation efficiency. Again, this geometry allows contacts 342 on both sides of the rib waveguide.

In FIG. 3E is presented a modulator implementation 320 based on a partially etched ring cavity 320A whose cross-section is a rib waveguide 322. The n doping regions 354 and p doping regions 356 are located only on half or close to half unit-cell, with contacts 352 near the central portion 360 and half way out. They form longitudinal p-n junctions (where the depletion region is parallel to the direction of light propagation) with the p-n junction interface located at or close to the radial center of the rib waveguide based ring 316 to achieve maximal overlap with the optical field mode. The p-n junctions are located along the azimuthal direction such that the overlap of the depletion regions with the optical field maxima of the standing-wave mode is maximized. The other part of the unit-cell is left intrinsic and is located where minima of the standing-wave mode are present. This region can be sized to remove the optical losses coming from regions of the cavity where the modulation of the standing-wave mode is not efficient. Apart from improving the quality factor of the cavity, this configuration reduces the device capacitance without affecting its series resistance leading to a faster and more efficient device.

In FIG. 3F modulator implementation 324 based on a fully-etched ring cavity 324A with a strip waveguide profile 326 where the p-n junctions are defined vertically. The unit-cell of the modulator is composed of an active region 364 where the p-n junctions are placed longitudinally (where the depletion region is parallel to the direction of light propagation) with the same considerations of FIG. 3E in terms of placement to maximize the overlap with the optical field hence the modulation efficiency. Previous considerations in terms of efficiency and speed benefits are also valid in implementation 324. A set of pairs of contacts 362 is required to drive each unit-cell (and an etch-step is necessary for the n-type contact). To reduce the number of contacts it is possible to leave an active p-n region on the inner ring edge to contact all the unit-cells simultaneously without affecting optical loss. The central region 360 in implementation 324 is fully-etched away and thus intrinsic.

Figure 4:
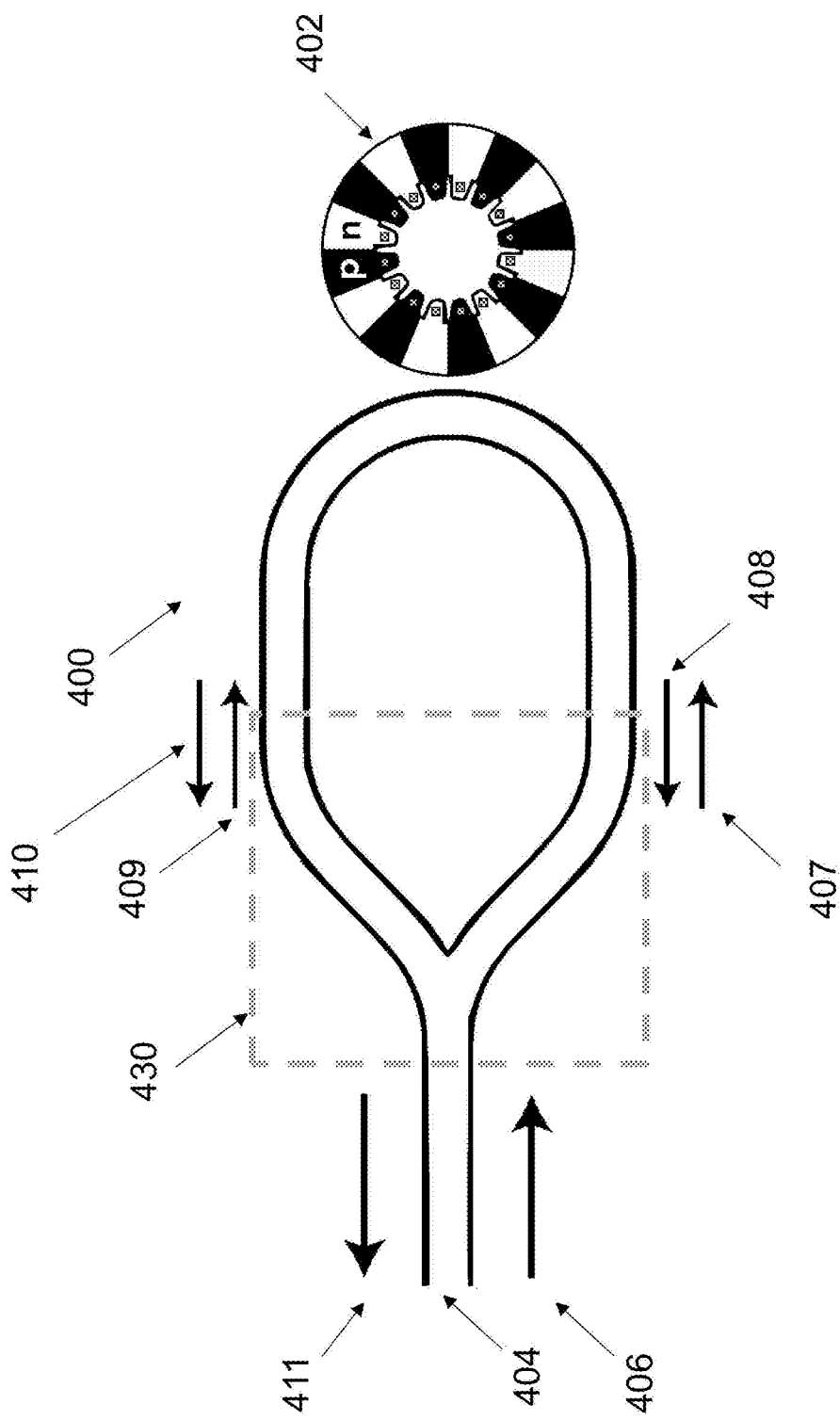
FIG. 4 is a top view of a modulator according to the present invention that allows standing wave excitation in the traveling wave modulator.

FIG. 4 shows a modulator architecture 400 that allows standing wave excitation in the traveling wave modulator. The modulator has the shortest interaction length with the bus waveguide 404.

The architecture implementation 400 in FIG. 4 is based on a 3 dB splitter 430 which splits the input signal 406 to provide a bi-directional excitation (407 and 409). In such an implementation the cavity 402 lies outside the bus waveguide loop 404 carrying the excitation 406, and is evanescently coupled to the loop waveguide. The modulated outputs from the cavity (408 and 410) are recombined from the 3 dB splitter 430 into a single output 411. This implementation requires a circulator in order to separate the input continuous wave light from the output modulated light.

Figure 5:
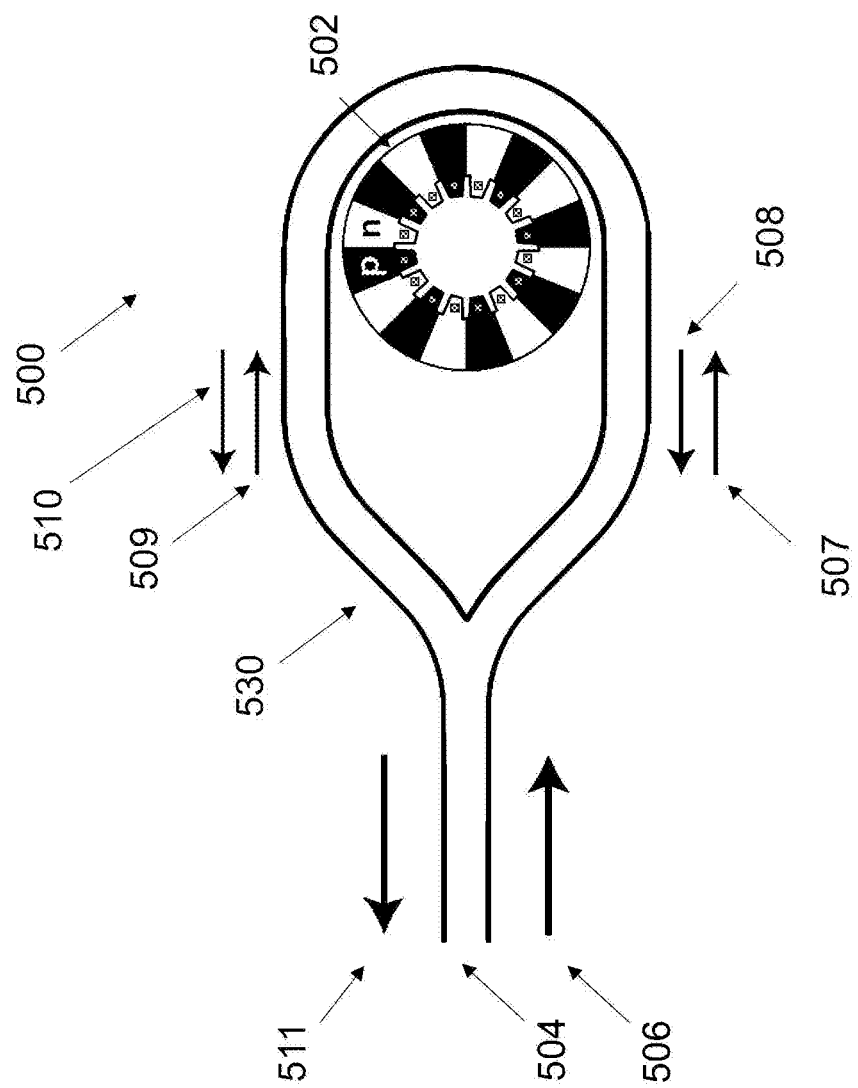
FIG. 5 is a top view of a modulator according to the present invention wherein the bus waveguide is wrapped around the modulator allowing for longer interaction length.

FIG. 5 shows a modulator architecture 500 that allows standing wave excitation in the traveling wave modulator. The bus waveguide 504 is wrapped around the modulator allowing for longer interaction length A second architecture implementation 500 in FIG. 5 which is analogous to the one in FIG. 4 presents resonant cavity 502 inside bus waveguide loop 504 rather than outside of it. Input signal 506 is split via splitter 530 to provide bidirectional excitation 507, 509. The relative profile of the coupling region between the bus waveguide and the resonant cavity depends upon its geometry and operation wavelength. Excitation 506 is evanescently coupled to the loop waveguide. The modulated outputs from the cavity (508 and 510) are recombined from the 3 dB splitter 530 into a single output 511. This implementation requires a circulator in order to separate the input continuous wave light from the output modulated light. It may be advantageous to use this geometry to allow the coupling region to be gradual (slowly changing coupling gap) for low coupler region radiation loss, and to allow phase matching between the modulator cavity and the bus waveguide for larger coupling gaps to be used for the same total coupling, simplifying fabrication.

Figure 6:
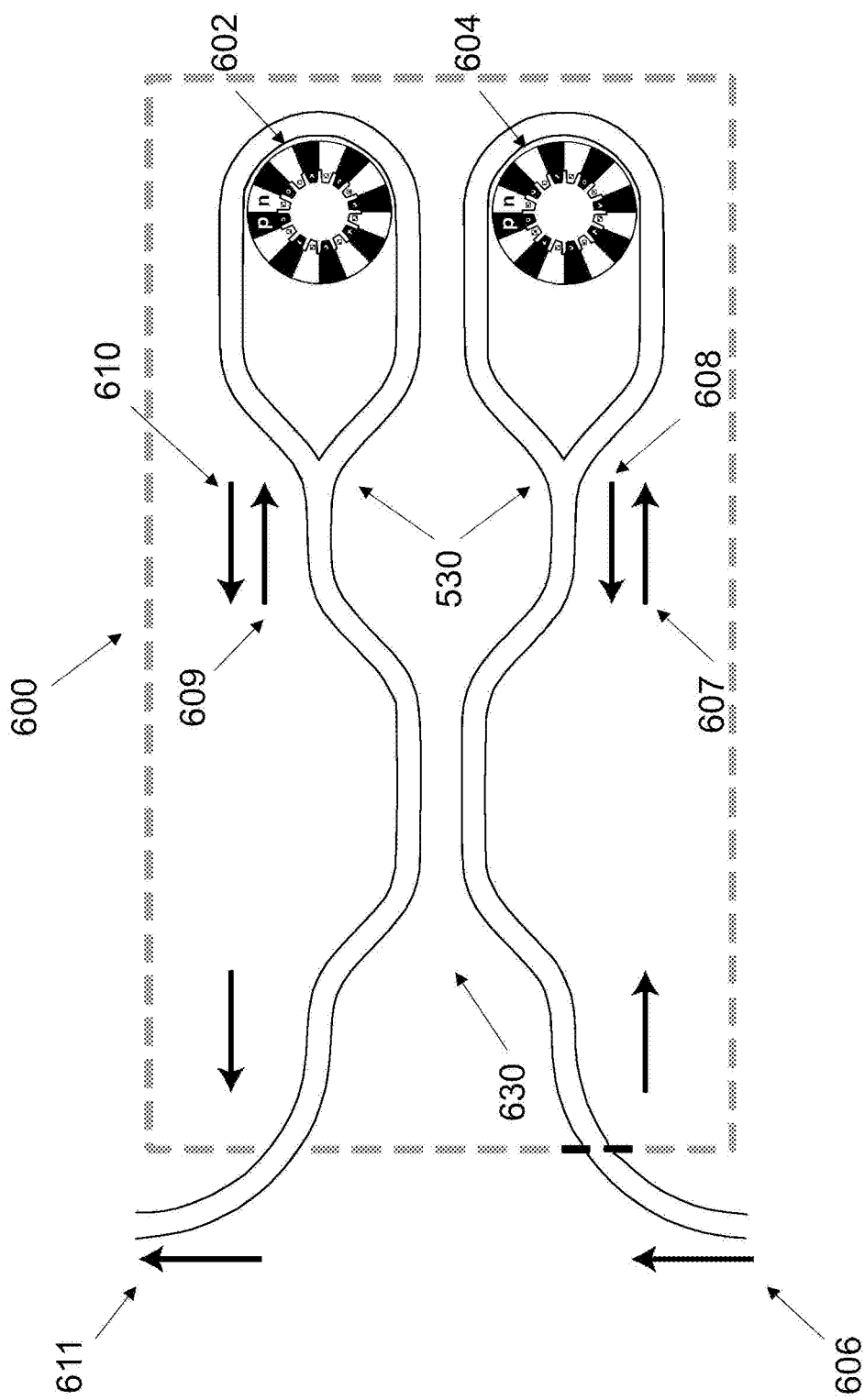
FIG. 6 is a top view of a modulator according to the present invention that allows separation of input and output ports without the need for optical circulators.

FIG. 6 shows a modulator architecture 600 that allows standing wave excitation in the traveling wave modulator, as well as separation of input and output ports without the need for optical circulators.

A third architecture implementation 600 in FIG. 6 exploits two resonant cavities 602 and 604 (here in the configuration of FIG. 5 but the configuration of FIG. 4 could also be used) driven synchronously electrically, i.e. in phase, to avoid the need to use a circulator. When the input light 606 initially travels straight through the central 3 dB coupler 630 there is a 90° additional phase delay in the top arm relative to the bottom arm. The light is split by the splitter 530 and provides the excitation 607 and 609 of the cavities. The two modulators then perform identical modulation on the signals in the two arms in parallel. Finally, the modulated outputs (608 and 610) go through the coupler 630 again, and interfere constructively into the upper waveguide to the through port, and destructively to the bottom waveguide producing no reflection leading to output 611 only on the top waveguide.

Excitation of a full standing wave, as is done in implementations 400, 500, and 600, provides maximum benefit in terms of improved Q factor (reduced loss) and simultaneously increased modulation efficiency. However, these schemes are more complex than the standard ring-bus waveguide excitation scheme of a typical traveling wave resonant modulator, as illustrated in FIG. 1 with a single input port 106 and a single output (through) port 108 automatically excited via the coupling geometry to a traveling wave cavity, and no reflection (or, little reflection in the case where the cavity has unwanted contradirectional coupling due to e.g. sidewall roughness). The one downside of using the design in FIG. 6 is that, although no circulator is required, twice the energy is used compared to a single modulator. Otherwise, the optical modulation efficiency is the same as FIGS. 4 and 5, if the 3 dB splitters are efficient. Simply half the light is processed in each of the two modulator devices.

Figure 7:
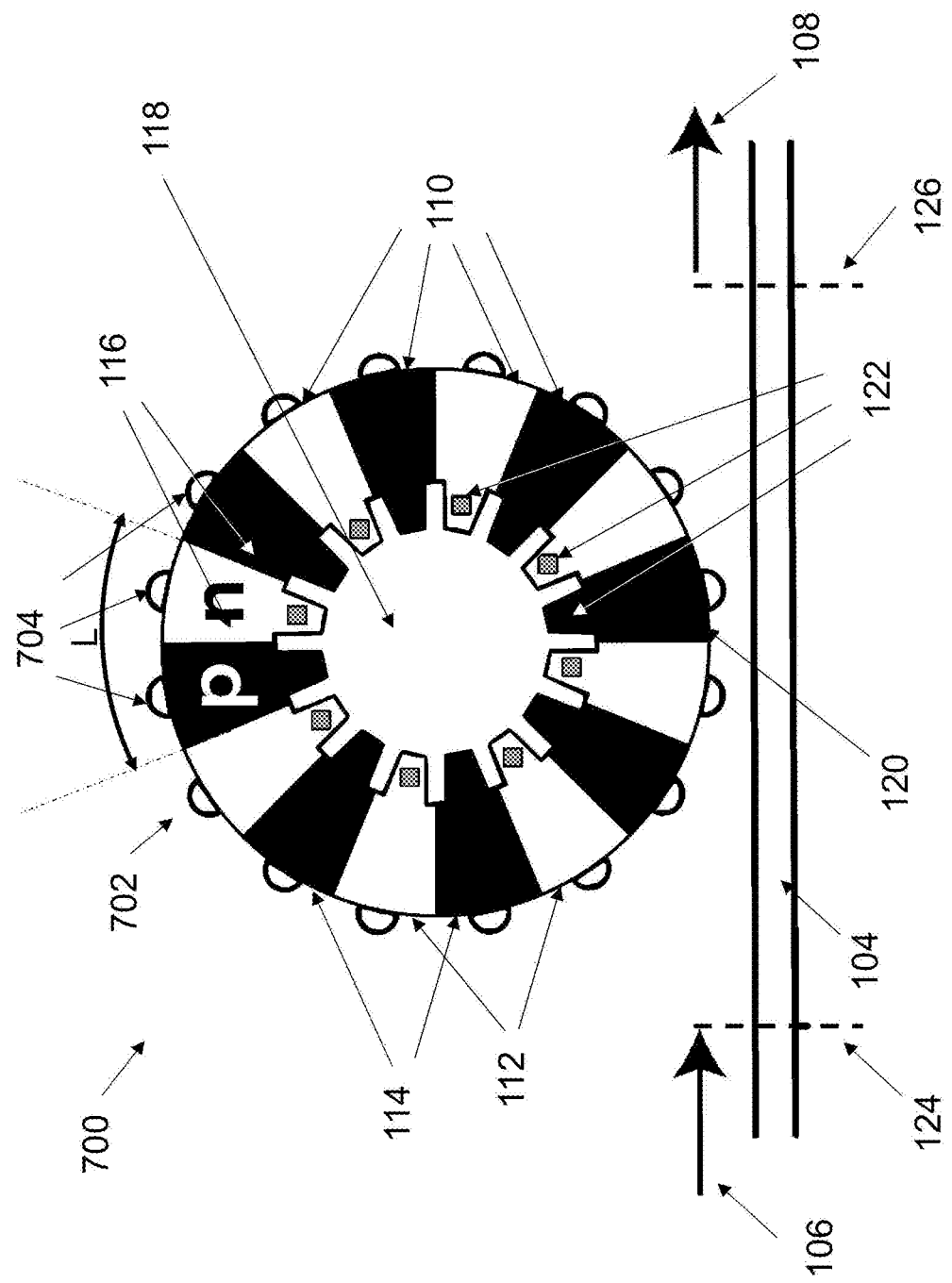
FIG. 7 is a top view of a grating-assisted ring modulator according to the present invention.

FIG. 7 shows a grating-assisted ring modulator design 700 that allows standing wave excitation in the modified traveling wave modulator cavity 702 in a simple, traveling wave excitation geometry, through the use of an assistive, periodicity-matched cavity grating 704.

A fourth architecture implementation 700 in FIG. 7 provides a simple system having a single bus 104 such as that shown in FIG. 1. Because FIG. 7 shows a traveling-wave excitation geometry, initially the forward (counter-clockwise) traveling-wave mode will be excited. Grating 704 excites the backward (clockwise) mode in order to create a standing wave pattern. The grating "spatial phase", i.e. position in the cavity relative to the junctions (or other modulated regions) is chosen in order to have optical intensity maxima of the produced full or partial standing wave aligned with the modulated regions. The grating period is close to half the unit-cell periodicity L. For a grating-assisted operation the induced backward (clockwise) mode (generated from the initially excited forward, counterclockwise mode via the grating perturbation) will not have in general the same amplitude of the clockwise mode thus only a partial standing wave may be obtained. More generally, if the grating is strong enough to produce resolved resonance splitting, a full standing wave is generated, but some reflection into the input port results. If the grating is weaker and the resonance splitting due to forward-backward mode coupling is not resolved (i.e. splitting on the order of the linewidth or less), then a partial standing wave is excited, enabling less gain in efficiency over a traveling wave case than a complete standing wave, but potentially reducing the reflected light into the input port. The implementation 700 is not as efficient as the previous ones in terms of modulation efficiency, but has the advantage of easier implementation, no 3 dB splitters that could introduce additional loss, no phase shifters and careful control of phase (the grating orientation relative to junctions can be very well controlled in lithography), and no active complex electronic control and synchronization.

Various modifications of the above implementations and driving conditions are considered herein included the present invention.

In order to demonstrate that the standing wave operation is more efficient than the traveling wave one, quasi-static transmission spectra for the different implementations are calculated based on a simplified resonator structure comprising interdigitated p-n junctions with carrier concentrations of $10^{18}$ cm$^{-3}$, intrinsic loss Q related to bending losses equal to 250,000 and confinement factor in the cross-section equal to 63%. The complex refractive indices are evaluated at a wavelength of 1300 nm. Full depletion approximation has been considered in the calculations. This approximation is valid in the negligible current regime (cavity depletion percentage far from approaching zero), far from the conduction state of the diode. The modulator is considered to be critically coupled at 50% cavity depletion percentage. What this means is the following. Critical coupling is a condition where input coupling and internal cavity loss are made equal in design (by choice of input coupling primarily); this results in exactly zero transmission on resonance. When the carrier density is being modulated, the total carrier density is changing, and so are both the resonance frequency and the loss (linewidth) of the cavity. Therefore, critical coupling in a dynamical device like this can only be ensured at one modulation state. Here it was chosen to be the state in which 50% of the cavity has carriers and 50% of the cavity is taken up by the depletion regions (with negligible free carriers concentration). At 50% critical coupling the difference between the carrier induced losses in the traveling wave and standing wave case is the largest for the chosen configuration. Moreover, this percentage offers the optimum RC trade-off when considering a lumped model of the diodes.

Figure 8A:
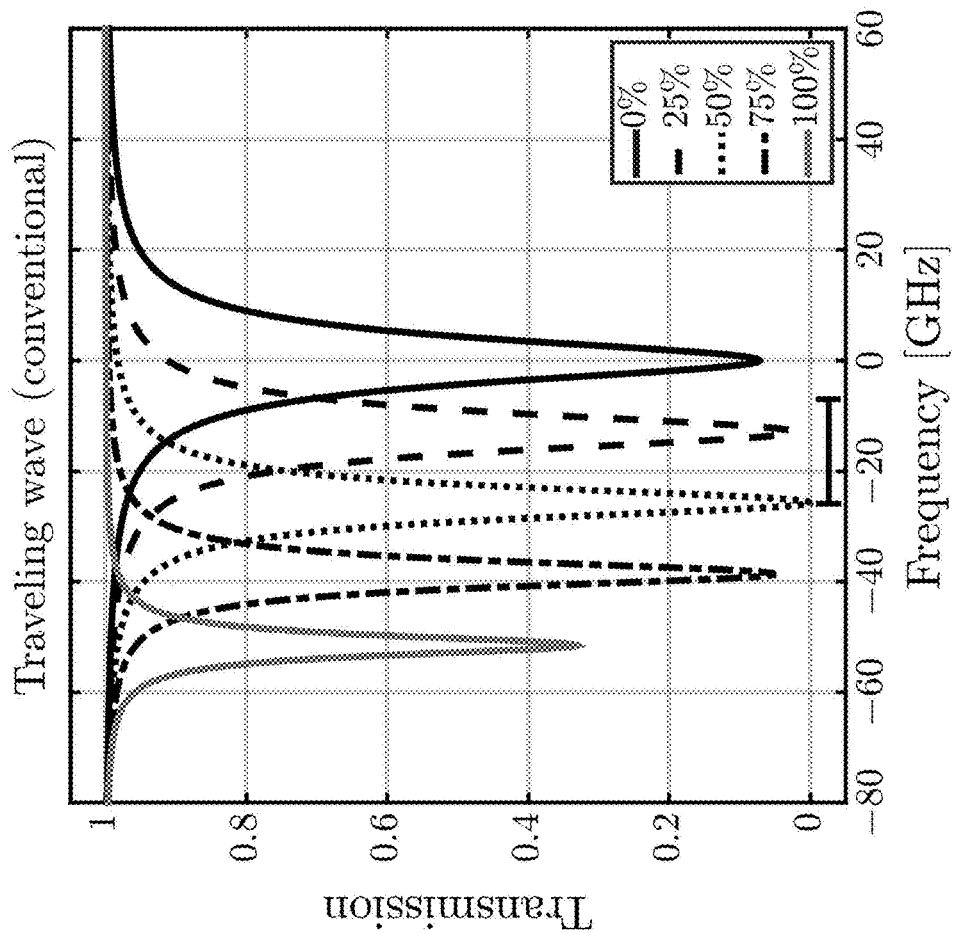
FIG. 8A (Prior Art) is a plot showing simulated shift spectra of a unidirectional traveling wave interdigitated modulator critically coupled at 50% cavity depleted.

FIG. 8A (Prior Art) shows simulated shift spectra of a traveling wave interdigitated modulator such as modulator 100 of FIG. 1 (Prior art) critically coupled at 50% cavity depleted. In FIG. 8A the transmission spectra for a traveling wave case are reported as a function of the cavity depletion percentage for device 100. In this case the frequency shift is proportional to the cavity depletion percentage (e.g. 26 GHz shift in 50% depletion compared to full depletion of 0%, i.e. frequency axis origin) and the transmission goes to zero at critical coupling when the external coupling rate is equal to the overall loss cavity rate. Linewidth of the 50% doped cavity is around 7 GHz in this example.

Figure 8B:
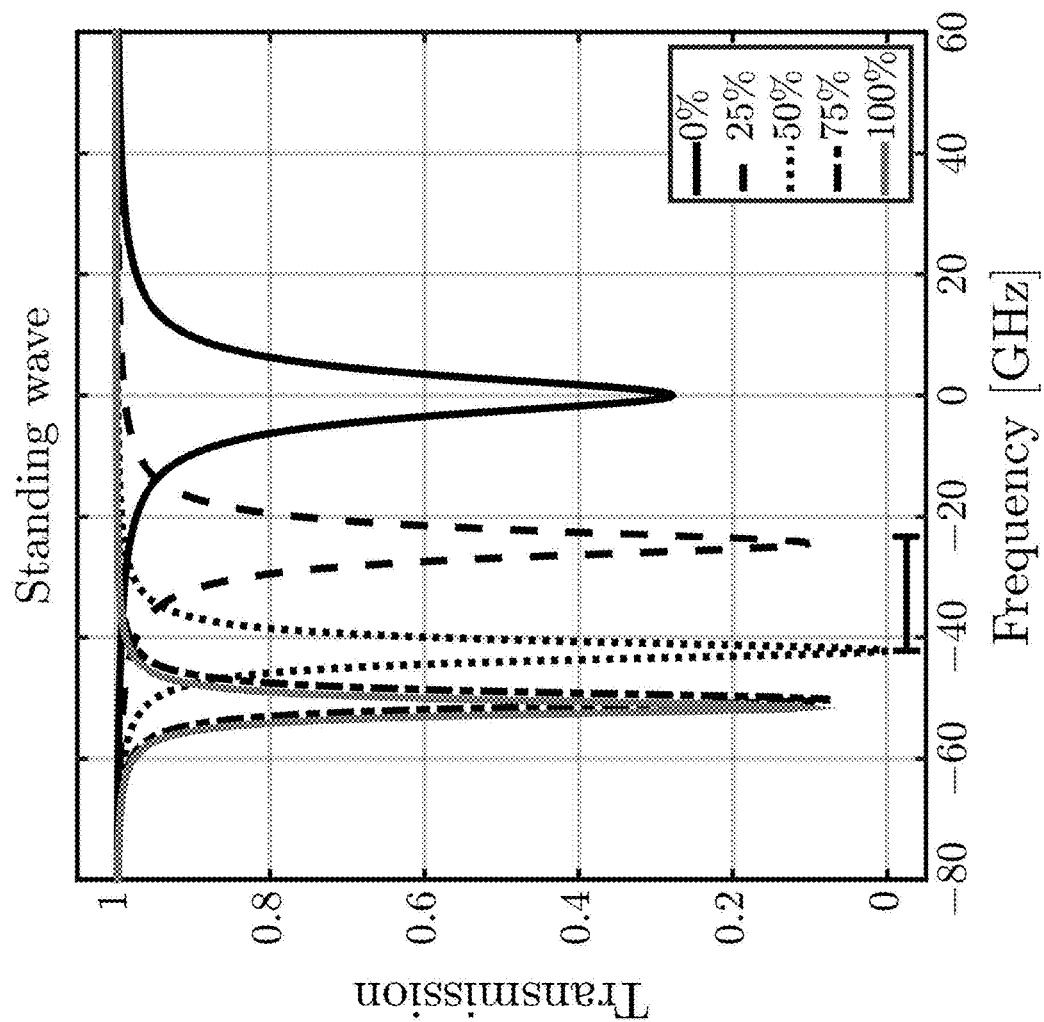
FIG. 8B is a plot showing simulated shift spectra of a standing wave excited interdigitated modulator according to the present invention critically coupled at 50% cavity depleted.

FIG. 8B shows simulated shift spectra of a standing wave excited interdigitated modulator such as modulator 200 of FIG. 2A critically coupled at 50% cavity depleted. In FIG. 8B the transmission spectra for a full (pure) standing wave excited case are reported as a function of the cavity depletion percentage. It is clear that at 50% depletion cavity percentage the linewidth (3.7 GHz) is smaller (by almost a factor 2) and the frequency shift is larger (42 GHz, i.e. a factor of 1.8 larger) than for a traveling wave case (the shift from 50% to 25% is indicated in the FIG. 8 with bar at the bottom of the plot). This configuration is an optimal one to take advantage of the longitudinal p-n junctions geometry (interdigitated doping distribution in this example) due to the exclusive excitation of the "low loss mode".

Next, referring to the "low loss mode", some comparisons can be made regarding low and high loss standing wave modes in the resonators described above. A conventional traveling wave resonator 100 in FIG. 1 does not generally have the same number of p-n periods as number of wavelengths around the resonator. Thus, traveling wave modes are formally degenerate modes of the passive cavity, and generally the introduction of the p-n doped regions does not change that (spatial harmonics of the square doping profile could in principle split some of the resonances into standing wave modes, but for most resonances this is not the case). In the standing wave case modulator 200 in FIG. 2A, the p-n junction pair count is equal to the number of wavelengths around the resonator (i.e. the local period L is equal to the local guided wavelength, even if the structure globally were not periodic). In this case, a passive resonator has traveling wave degenerate modes, but the introduction of doped p and n regions couples the modes and formally makes the resonant modes of the structure standing wave modes, at least before any outside waveguide coupling is introduced. There is both real coupling (effective refractive index change) and imaginary coupling (from absorption), causing a complex frequency splitting, producing a pair of resonances, split in frequency and having different Q's. One standing wave mode has its intensity maxima in the low loss regions (depletion regions) and minima in the regions with loss (carriers). This is called the "low loss mode" or "high-Q" mode, and it is generally the most useful. The second standing wave mode has its maxima in the lossy regions and minima in the lossless regions. This is the "high loss mode" or "low Q" mode. Excitation of this mode is to be avoided in an efficient device, and the implementations in FIG. 4-6 achieve this by symmetry of the excitation. FIG. 7 sacrifices some performance by allowing this mode to be excited, which is why spectra in FIGS. 8C and 8D show doublet resonances, unlike FIG. 8B of the pure standing wave designs of FIGS. 4-6.

Figure 8C:
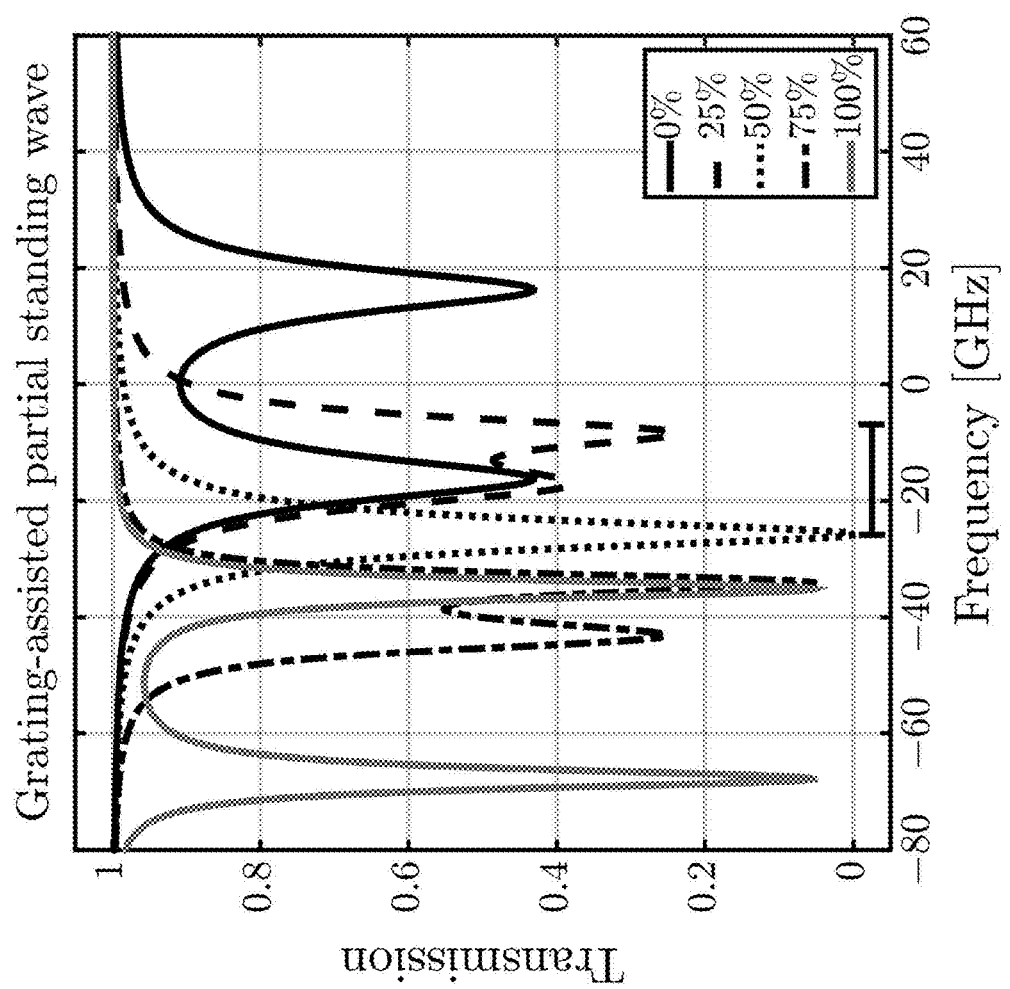
FIG. 8C is a plot showing simulated shift spectra of a grating-assisted interdigitated modulator according to the present invention critically coupled at 50% cavity depleted, with moderate splitting of the resonances.

FIG. 8C shows simulated shift spectra of a grating-assisted interdigitated modulator critically coupled at 50% cavity depleted, with moderate splitting of the resonances. FIG. 8D shows simulated shift spectra of a grating-assisted interdigitated modulator for a large splitting of the resonances.

Figure 8D:
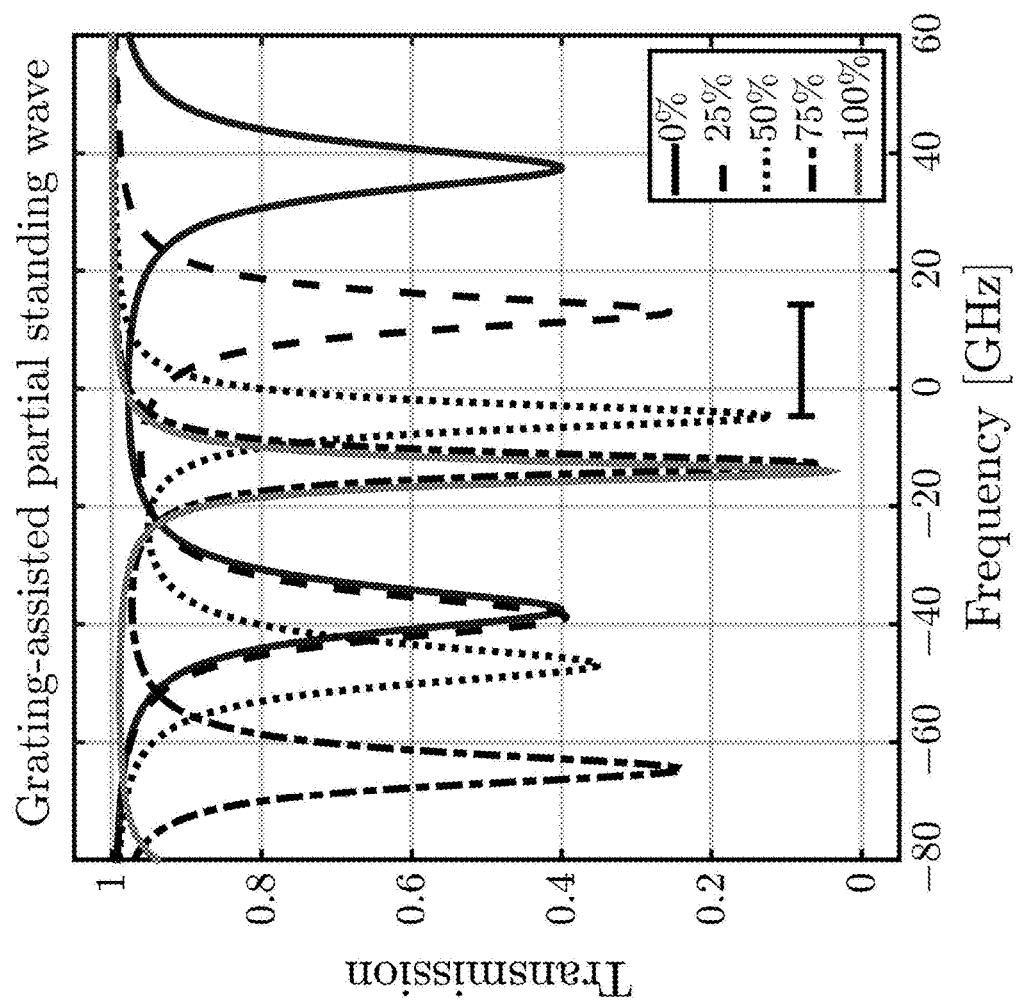
FIG. 8D is a plot showing simulated shift spectra of a grating-assisted interdigitated modulator according to the present invention for a large splitting of the resonances.

In FIGS. 8C and 8D the transmission spectra for grating-assisted partial standing wave devices in FIG. 7 are reported as a function of the cavity volume depletion percentage. The critical coupling in FIG. 8C is achieved by choosing the external coupling equal to the geometrical mean of the losses of the two supermodes of the system, high loss and low loss ones corresponding to when maxima of optical intensity coincide with lossy and lossless (modulating) regions, respectively. The grating induced splitting for critical coupling is chosen equal to the splitting associated with the difference in real refractive indices of the two supermodes. The traveling wave case presents carrier losses which are around 30% higher than in this configuration. The differential frequency shift instead is nearly the same around 50% of cavity depletion percentage. In FIG. 8D the splitting is much larger than the linewidths to have the two resonances well separated. This is a design with a stronger sidewall grating on the resonator. The expressions of mode overlap with sidewall grating needed to produce a desired amount of contradirectional coupling and resonance frequency splitting are well known in the field to translate these design parameters to physical dimensions. The modulator would be operated in the low loss mode (resonances with smaller linewidths and higher extinctions in FIG. 8D). In such a situation the frequency shift remains the same, while the linewidth is slightly broadened due to the choice of having the external coupling equal to the traveling wave case in order to improve the extinction ratio at resonance. The reason for an imperfect extinction ratio as in FIGS. 8A and 8B is related to the non-optimal excitation and interference of the two traveling wave modes. However, although the performance in this example is not much different than the traveling wave case, the grating assisted approach permits larger carrier concentrations and closer metallic contacts in the minima of the optical intensity, while keeping higher Q's and frequency shifts than the traveling wave case counterpart.

Other possible applications of the presented device concepts include detectors. Resonant detectors can detect light by providing an optical frequency device linewidth wide enough to accommodate the modulation speed (bandwidth) of the incoming signal to be detected. Then, an intracavity absorption mechanism is used to absorb light and generate photocarriers. If the external coupling is matched to the loss, the light circulates the resonator just the right number of times in order for all incident light to be absorbed. In order to efficiently collect the photogenerated carriers, devices such as those shown in FIGS. 2A-2B, and 4-7 in standing or partial standing wave operation may be used. In this case, the most likely electrical device design would be a p-i-n diode array, distributed along the azimuthal direction so that one has p-i-n-i-p-i-n . . . along the direction of light propagation. The light generated in the intrinsic (i) regions is extracted quickly by the applied reverse bias field, or built-in field, of the diode. Carriers generated in the p and n regions must diffuse to the i region to contribute to photocurrent, so they respond more slowly and are less useful. Ideally, all absorption would be in the i region, and none in the p and n doped regions. For this purpose, we may again use standing wave excitation, as in FIG. 2A-2B, 4-7, but with an intrinsic region between each p and n regions. This time, we place the field maxima in the i region, and field minima on the p and n regions. Furthermore, the centers of the p and n regions could be doped more highly, right near the field null, to improve the electrical driving of the diodes while maintaining low optical loss.

FIGS. 8A-8D were created using various parameters for the resonators.

Wavelength: 1.3 um
Outer radius: 5 um
Inner radius: 3.8 um
Cross-section from 12soi process design kit
Effective index: 2.1 (evaluated from mode-solver simulations)
Group index (evaluated from mode-solver simulations): 3.1
Equivalent unit-cell period (to match the wavelength in the cavity): 620 nm
Passive/intrinsic quality factor Q: 250,000 which leads to a passive loss rate ro
Doping concentrations: geometrically symmetric with respect to center of unit-cell
Doping concentrations p and n-type: 1e18 $cm^{-3}$
Lossless ring-to-bus coupling considered External coupling strength re (FIG. 3A-B): chosen to be critically coupled to a 50% cavity depletion state (re=rd*+ro) with rd* cavity loss rate for the mode under investigation.

Grating strength (FIG. 3C) µ: equal to half the difference between the frequency split of the two standing wave modes $\mu=0.5(\omega_s-\omega_a)$ External coupling strength re (FIG. 3C): chosen to be equal to the geometric mean loss rate due to the doping for the low loss and high loss standing wave mode at 50% cavity depletion state (re=((rds+ro)(rda+ro))$^{0.5}$ with rds/rda cavity loss rate for the standing wave modes.

Grating strength (FIG. 3D) µ: 15× cavity loss rate due to full-cavity doping rd (µ=15×rd)

External coupling strength re (FIG. 3D): chosen to be equal to the loss rate due to the doping for the low loss standing wave mode at 50% cavity depletion state (re=rd*+ro) with rd* cavity loss rate for the mode under investigation.

Those skilled in the art of electro-optic modulators will appreciate that these parameters are just examples. The invention applies to a variety of cavities which can support standing wave modes and which allow a periodic patterning of p-n junctions or the like.

Various mechanisms for absorbing light and producing photogenerated carriers are possible. In silicon, one mechanism that has been studied is absorption due to defect states. This mechanism provides photodetection potentially on a wide wavelength range from 1 to 2 microns and perhaps higher. Another option is the use of silicon for wavelengths above its bandgap (below 1100 nm or so), e.g. in the visible. In this case the waveguides would generally be transparent in the visible, e.g. using silicon nitride, but the resonator may be able to remain silicon. This could also be used with microphotonic structures made of germanium (Ge) or SiGe. The same techniques also apply to III-V semiconductors and could be used with for example GaAs, InGaAs, InAlAs, AlGaAs, InP, InGaAsP, etc. Finally, silicon or other high index contrast resonators could provide the resonant structure, while the electrodes could be various doped 2D materials, such as graphene, MoS2, etc., placed in sheets in the evanescent field of the resonator. So long as their carrier absorption, modulation, etc., entails both optical loss and refraction, the techniques presented here may be of use in producing efficient optoelectronic device designs.

While the description provided herein used as an example a circular, azimuthally-invariant disk resonator, operating in a fundamental transverse mode, with azimuthally arranged p and n doping regions in silicon, a number of other resonator geometries, optical mode and modulating region configurations, and materials are possible that use the same principles. Specifically, any traveling resonator geometry can be a starting point, including racetrack resonators, microring resonators with cross-section varying along the length of the resonator (one example being so-called adiabatic microring resonators), and rib waveguide microring resonators or vertical junction based disk/ring resonators. In terms of optical mode, preferably a fundamental transverse mode is used (TE or TM like) to minimize mode volume. However, it is possible to make use of other optical field patterns that have higher order transverse behavior, i.e. nulls in the transverse field distribution. The general concept is to place refractive index modulating regions in the field maxima, and unmodulated or index non-modulating regions in the field nulls or minima. The range of materials has been described above, but essentially the techniques apply to any material system, with the primary criterion being strong optical confinement (high index contrast).

What is claimed is:

1. An electro-optic modulator for modulating optical light comprising:
    an optical resonator having first doped semiconductor regions interspersed with second second doped semiconductor regions such that applying an electrical field results in regions of modulated carrier density and regions of unmodulated carrier density and affects the index of refraction of the resonator;
    apparatus for providing an electrical signal for controlling carrier density in the optical resonator;
    a bus waveguide for coupling light to the optical resonator via a coupling region; and
    apparatus for exciting at least a partial standing wave resonance in the resonator such that the standing wave resonance has peaks of the optical field substantially overlapping regions of modulated carrier density;
    such that light in the bus waveguide operates to excite the standing wave resonance and the electrical signal operates to modulate the light.

2. The electro-optic modulator of claim 1 wherein the apparatus for exciting at least a partial standing wave includes two ports in the bus waveguide, each port supporting an incident wave and a reflected wave for bidirectional excitation.

3. The electro-optic modulator of claim 1 wherein the apparatus for exciting at least a partial standing wave includes a grating structure formed on the resonator.

4. The electro-optic modulator of claim 1 wherein the resonator comprises one of the following configurations:
    (a) a fully etched disk with an intrinsic central region;
    (b) a fully etched ring;
    (c) a partially etched rib-waveguide ring with contacts on both sides of the rib; or
    (d) a strip-waveguide profile wherein p-n junctions are defined vertically.

5. The electro-optic modulator of claim 1 wherein the bus waveguide comprises a loop and wherein the apparatus for exciting at least a partial standing wave includes a coupler which splits input light into the loop to provide bidirectional excitation.

6. The electro-optic modulator of claim 5 wherein the resonator is coupled to the bus waveguide by means of a point-to-point coupling and wherein the resonator lies external to the bus waveguide loop.

7. The electro-optic modulator of claim 5 wherein the resonator is coupled to the bus waveguide by means of a distributed coupling and wherein the resonator lies internal to the bus waveguide loop.

8. An electro-optic modulator system comprising two electro-optical modulators according to claim 5 and further comprising a coupler for linking the bus waveguides such that both devices are excited simultaneously and such that when one bus waveguide is addressed by input light the other bus waveguide transmits modulated light.

9. The electro-optic modulator of claim 1 wherein the apparatus for providing an electrical signal includes metallic contacts disposed within the regions of unmodulated carrier density.

10. The electro-optic modulator of claim 9 wherein the optical resonator forms a ring of interdigitated n-doped and p-doped regions.

11. The electro-optic modulator of claim 10 implemented in CMOS compatible processes.

12. The electro-optic modulator of claim 10 wherein n-doped regions comprise lightly and heavily doped areas, and the p-doped regions comprise lightly and heavily doped areas.

13. The method for electro-optically modulating light comprising the steps of:
 (a) forming an optical resonator having first doped semiconductor regions interspersed with second doped semiconductor regions;
 (b) applying an electrical signal to the optical resonator and causing regions of modulated carrier density and regions of unmodulated carrier density within the resonator;
 (c) providing a bus waveguide adjacent to the optical resonator for coupling light to the resonator;
 (d) providing a bidirectional light input to the bus waveguide such that at least a partial standing wave resonance is generated in the optical resonator, wherein the standing wave resonance peaks substantially overlap regions of modulated carrier density and standing wave resonance nulls substantially overlap regions of unmodulated carrier density; and
 (e) varying the electrical signal wherein the refractive index of the resonant cavity is locally varied and modulating the light.

14. The method of claim 13 wherein step (d) comprises the step of providing two spaced apart ports in the bus waveguide and directing an incident wave into each port.

15. The method of claim 13 wherein step (d) comprises the step of forming the bus waveguide into a loop and providing a coupler and splitting input light into branches of the loop.

16. The method of claim 15 further including the steps of: providing point-to-point coupling; and
 configuring the resonator external to the bus waveguide loop.

17. The method of claim 15 further including the steps of: providing distributed coupling; and
 configuring the resonator internal to the bus waveguide loop.

18. The method of claim 15 further including the steps of:
 (a) forming a second optical resonator having first doped semiconductor regions interspersed with second doped semiconductor regions;
 (b) providing a second bus waveguide for coupling light to the second resonator by forming the second bus waveguide into a loop and providing a coupler and splitting input light into branches of the loop; and
 (c) providing a system coupler for linking the bus waveguides such that both optical resonators are excited simultaneously and such that when one bus waveguide is addressed by input light the other bus waveguide transmits modulated light.

19. An electro-optic detector for detecting input optical light comprising:
 an optical resonator having interdigitated diodes and electrical contacts configured to cause intrinsic regions of a p-i-n diode to overlap with peaks of input optical light intensity;
 a bus waveguide for coupling input light to the optical resonator via a coupling region; and
 apparatus for exciting at least a partial standing wave resonance in the resonator such that the standing wave resonance has peaks substantially overlapping regions of modulated carrier density and nulls substantially overlapping regions of unmodulated carrier density;
 such that light in the bus waveguide operates to excite the standing wave resonance and the electrical signal operates to modulate the light.

20. The detector of claim 19 implemented in CMOS compatible processes.

* * * * *